United States Patent
Singh et al.

(10) Patent No.: US 12,423,452 B1
(45) Date of Patent: Sep. 23, 2025

(54) INFRASTRUCTURE-AS-CODE VALIDATION WITH LANGUAGE MODELS

(71) Applicant: Google LLC, Mountain View, CA (US)

(72) Inventors: Sushant Kumar Singh, Bangalore (IN); Karthik Kumar, Bangalore (IN); Jashanjot Kaur, Bangalore (IN); Kishore Kumar Garg, Bangalore (IN); Pankhuri Saxena, Bangalore (IN); Mukesh Kumar Marodia, Hyderabad (IN); Priyanka Tiruveedhula, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/675,631

(22) Filed: May 28, 2024

(51) Int. Cl.
*G06F 21/62* (2013.01)

(52) U.S. Cl.
CPC .................. *G06F 21/6209* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 2023/0164164 A1* | 5/2023 | Herzberg | ................ | H04L 63/20 726/1 |
| 2024/0086190 A1* | 3/2024 | Kwatra | .................. | H04L 63/20 |

OTHER PUBLICATIONS

Luke Hoban, The Present and (Near) Future of AI and Infrastructure as Code, Feb. 13, 2024, pp. 1-11.
Joe Duffy, Going Beyond With Advanced Infrastructure as Code Use Cases, Nov. 21, 2023, pp. 1-12.
Yoni Leitersdorf, Adding IaC security scans to your CI pipeline with Indeni, May 25, 2021, pp. 1-13.
Yiming Qiu, et al., Simplifying Cloud Management with Cloudless Computing, Nov. 28, 2023, pp. 1-7.
Swaroop Sham, IaC Scanning: Concepts, Process, and Tools, Dec. 3, 2023, pp. 1-14.
What is Azure Policy? Apr. 15, 2024, pp. 1-11.
Lacework, Lacework infrastructure as code (IaC) security, Mar. 23, 2023, pp. 1-4.

\* cited by examiner

*Primary Examiner* — Kannan Shanmugasundaram
(74) *Attorney, Agent, or Firm* — Lerner David LLP

(57) ABSTRACT

Methods, systems, and apparatus, including computer-readable storage media for validation of Infrastructure-as-Code (IaC) configurations with added context, using a language model. A validation system can receive a request to validate an IaC configuration file. The request can include the IaC configuration file to be validated, as well as identifiers for identifying the policy from which validation requirements should be used for validating the IaC configuration file. Pre-trained machine learning models for generating natural language and/or structured code output may be fine-tuned to reduce or eliminate hallucinations, vague. or incorrect output, using training examples of syntactically correct IaC configuration files. An embedding repository of syntactically correct IaC configuration files and a repository of policy documents can be queried for augmenting the prompt to the language model.

17 Claims, 7 Drawing Sheets

INFRASTRUCTURE-AS-CODE VALIDATION WITH LANGUAGE MODELS

BACKGROUND

Infrastructure-as-code (IaC) is a computing paradigm in which source code, templates, scripts, etc., are used to represent and manipulate computing infrastructure, such as servers or other devices in data centers running on bare-metal and/or as virtual machines. An IaC configuration file can store data and instructions defining how infrastructure is to be configured or provisioned, for example as a prerequisite to setting up a computing environment for an application or service executed on the infrastructure. Executing the IaC configuration file can involve invoking one or more APIs for configuring and setting computing resources on the infrastructure, consistent with conditions and criteria set in the IaC configuration file.

IaC configuration files may require validation before changes are made to a target infrastructure consistent with the IaC configuration file. Requirements for meeting validation requirements can be provided in policies that may vary and be specific to the target infrastructure, the organization or entity creating a computing environment on the infrastructure, or the application deployed on the computing environment. Validation requirements often target potential misconfigurations in the IaC configuration file, to avoid possible security vulnerabilities in the deployed environment configured according to the IaC configuration file.

Validation requirements are often subject to change and highly-specific to the infrastructure, entity, and/or application corresponding to the deployed computing environment. This volatility often makes validation checkers based on scanning static code for validation in accordance with hard-coded rules inapplicable or outdated when applied to IaC configurations for different architectures, or even the same architecture if a policy changes unexpectedly. Further, there are no standard formats for policies describing or enumerating IaC validation requirements, which may be provided in natural language, structured code, or both.

BRIEF SUMMARY

Aspects of the disclosure are directed to validation of Infrastructure-as-Code (IaC) configurations with added context, using a language model. A validation system can receive a request to validate an IaC configuration file. The request can include the IaC configuration file to be validated, as well as identifiers for identifying the policy from which validation requirements should be used for validating the IaC configuration file. Pre-trained machine learning models for generating natural language and/or structured code output may be fine-tuned to reduce or eliminate hallucinations, vague, or incorrect output, using examples of syntactically correct IaC configuration files. An embedding repository of syntactically correct IaC configuration files and a repository of policy documents can be queried for augmenting the prompt to the language model. Other implementations of this aspect include corresponding computer systems, apparatus, and computer programs recorded on one or more computer storage devices, each configured to perform the actions of the methods.

DETAILED DESCRIPTION

Overview

Figure 1:
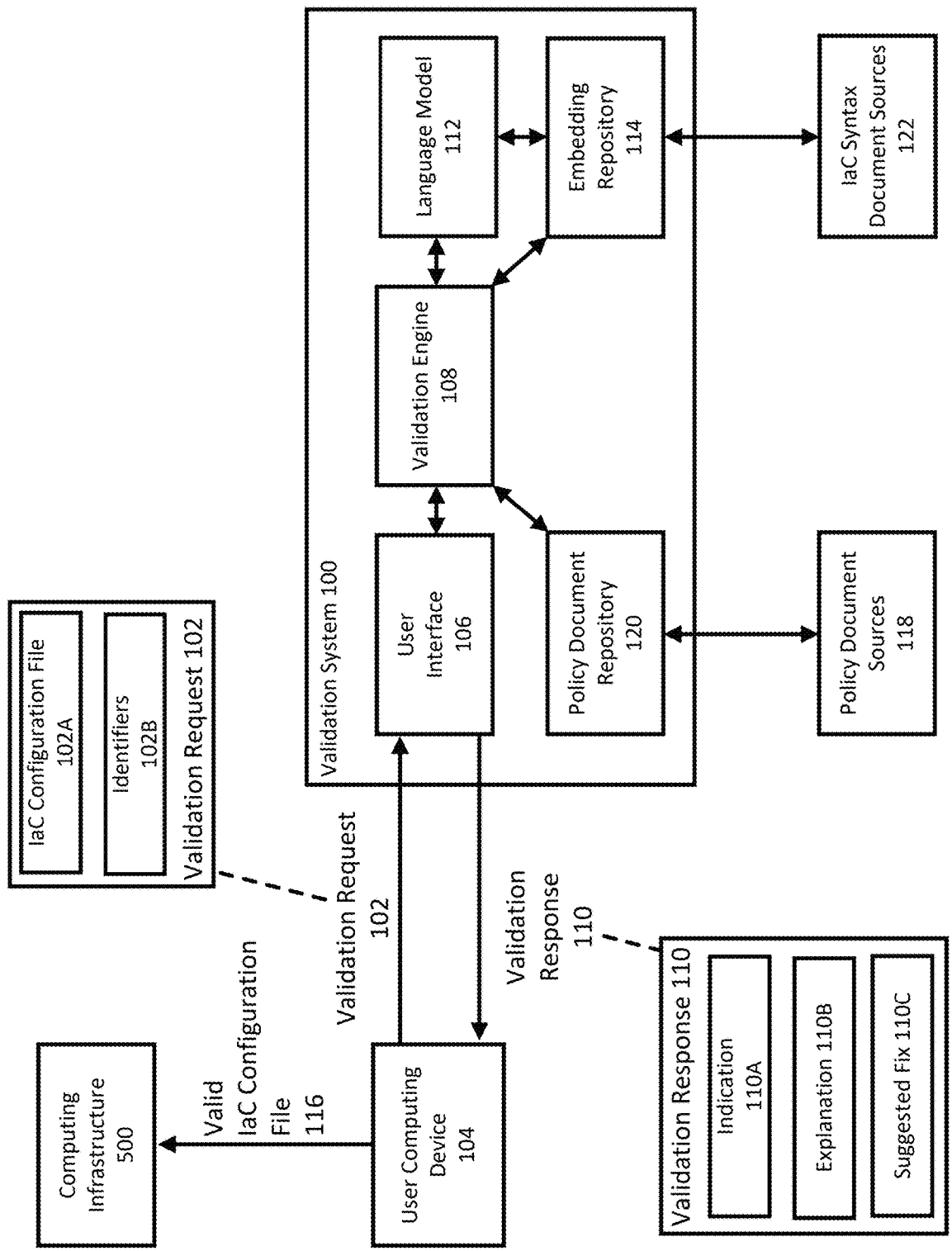
FIG. 1 is a block diagram of an example validation system, according to aspects of the disclosure.

Aspects of the disclosure are directed to validation of Infrastructure-as-Code (IaC) configurations with added context, using a machine learning model, such as a language model. A validation system can receive a request to validate an IaC configuration file. The request can include the IaC configuration file to be validated, as well as identifiers for identifying the policy from which validation requirements should be used for validating the IaC configuration file. The identifiers can include, for example, identifiers for the user, the infrastructure on which a computing environment corresponding to the IaC configuration is to be deployed, and/or the specific applications to be executed on the deployed computing environment.

The validation system generates additional context from policies corresponding to the one or more identifiers and generates output indicating whether or not the IaC configuration file is valid based on the corresponding policies. If the IaC configuration file is deemed not to be valid, the validation system can generate and provide suggested fixes, for example in the format of the configuration file.

A validation system can implement a machine learning model, for example a language model or other type of natural-language processing model, which is configured to receive and validate IaC configuration files to mitigate or eliminate possible security vulnerabilities in computing environments deployed in accordance with the IaC configurations. An IaC configuration file can be provided as part of a prompt to a machine learning model. The validation system queries a repository of documentation, which can be files or documents in natural language, structured code, or a combination of the two, and retrieves documents corresponding to the identifiers received in the request. The validation system can augment the prompt to validate the received IaC configuration with added context that includes the retrieved documents from the repository. The added context, when processed by a machine learning model, can reduce or eliminate the likelihood that the model generates erroneous output, e.g., hallucinations, or vague suggested fixes, when incorrect or imprecise responses are more likely to present security vulnerabilities in a computing environment deployed based on the IaC configuration file.

Vagueness of a language model output can occur without augmenting the prompt with additional context, and may occur, for example, due to the lack of context in the source of the IaC configuration file, the computing infrastructure on which an environment will be deployed, or the type of application that will execute on the computing environment. In addition, other approaches to IaC validation may be specific to certain types of the aforementioned infrastructures, sources, computing environments, or applications. Because policies for each may change unexpectedly and often, an approach relying on rule-checking hard-coded conditions becomes quickly outdated, possibly without knowledge that a policy has changed. A validation system as described here can retrieve policy documents from predetermined online sources, e.g., published online or stored in a network-accessible device.

The system applies an offline process to generate and update a repository of policy documents, which is more efficient than training or fine-tuning the model on new policies that emerge over time. The validation system can retrieve various policies accessible to the validation system, for example over a network or the internet. The retrieval can be performed through web-scraping, API calls to policy information exposed by an API, or through scanning or processing input directly to the validation system, through a user interface.

The validation system can process the policy information to label different components of a policy document. For example, the labels can relate to the name of a policy, the application or asset managed by the policy, one or more requirements of the policy, and any suggested fixes in the event the policy is violated. At this stage, the validation system can apply a keyword match or other filter to determine which parts of a retrieved policy document correspond to which of these labels in the predetermined format. The processed policy documents can be stored in accordance with this predetermined format.

The validation system can concatenate processed policy documents to the prompt to the machine learning model. The system determines which policy documents to concatenate based on the one or more identifiers in the validation request. For example, if an identifier is to a particular user or entity, the validation system can query the repository of policy documents to retrieve policy documents related to the entity. If a specific asset is identified in the request, the validation system can retrieve policy documents labeled for that specific asset, and potentially exclude some documents that may be responsive to the user generally, but not the asset specifically. The repository can be exposed to the validation system through an API, which the validation system can generate calls for retrieving policy documents responsive to the IaC validation request.

In some examples, the validation system can implement an embedding repository for querying and retrieving responsive documentation related to IaC configuration file syntax. IaC documentation related to IaC configuration file syntax can include examples of syntactically correct or incorrect IaC syntax. An embedding is a numerical representation of some data, e.g., IaC documents, such as examples of IaC syntax, in a numerical format. For example, an embedding can be a multi-dimensional vector, although in different examples other data structures storing values that are comparable to one another may be used. Generating embeddings from documentation related to IaC configuration file syntax allows for more efficient and effective comparison, e.g., because distances between embeddings in a vector space can be calculated and compared from one another to allow for a more direct comparison of similarities between policy documents represented by the embeddings. In some examples, retrieval augmented generation (RAG) can be used for retrieving and applying encoded representations of documentation related to IaC configuration file syntax.

Accessing the embedding repository for relevant syntax documentation can reduce or eliminate model hallucination, because the model can process the syntax documentation to avoid misunderstanding, to reduce the chance of generating syntactically incorrect IaC configurations as suggested fixes.

The validation system can generate an embedding from the request, e.g., from the IaC configuration file and one or more identifiers, and use the generated embedding to query the embedding repository for embeddings responsive to the request. Embeddings of IaC documents responsive to the request can be converted back to their syntax documentation equivalent and concatenated to a prompt to the machine learning model. Any encoder configured to generate encoded representations, such as embeddings, can be used. An example encoder can be based on a transformer neural network architecture. The encoder can generate embeddings from input at varying levels of granularity, e.g., at the sub-word level, the word level, and/or the sentence level or multi-sentence level.

Pre-trained machine learning models for generating natural language and/or structured code output may be fine-tuned for IaC validation with context. To avoid or eliminate hallucinations or vague or incorrect output, aspects of the disclosure provide for fine-tuning a pre-trained model. A pre-trained model can be fine-tuned, for example by a model training engine, over one or more fine-tuning iterations, to generate syntactically correct IaC configuration files.

At each iteration, fine-tuning data can be used to generate a loss relative to an objective, which can then be used to perform backpropagation with gradient descent to update model parameter values of the pre-trained model. The fine-tuning data can include examples of IaC configuration files of the same format or structure. The training examples can be, for example, syntactically correct versions of a syntactically incorrect IaC configuration file. The IaC configuration files may also be used to populate an embedding repository, as described herein.

The objective can be to minimize differences between predicted syntactically correct IaC configuration files by the model, with the ground-truth version of the IaC configuration file labeled in the fine-tuning data. The model trainer can perform multiple fine-tuning iterations until one or more stopping criteria are met, e.g., a maximum number of iterations is performed, results between iterations convergence within a predetermined threshold, a minimum predetermined increase in model quality is not met between iterations, and so on. The fine-tuned machine learning model can be deployed as the machine learning model for which the validation system generates prompts with context, as described above.

In some examples, IaC configuration files may be scanned by the validation system to avoid malicious code or content from being processed by the machine learning model. Pre-scanning the IaC configuration files can reduce the exposure of the machine learning model to malicious code, which in turn reduces the chance the model reproduces the malicious code, for example as a suggested fix. Also in some examples, responses by the machine learning model can also be scanned to prevent inadvertent malicious content from being disseminated. Scanning in this context can refer to evaluating code or content under a predetermined set of rules, to check for the presence or absence of certain strings or patterns of strings of text.

Example Systems

FIG. 1 is a block diagram of an example validation system 100, according to aspects of the disclosure. The validation system 100 validates Infrastructure-as-Code (IaC) configuration files. IaC configuration files may be provided as input to a computing infrastructure for configuring a computing environment. Computing infrastructure 500 can include computing resources, such as processing devices, memory devices, software, networking devices, and so on, which may be housed in one or more datacenters or other physical locations. A computing environment in this context can be a collection of computing resources provisioned for a particular user or software application or service.

The computing infrastructure 500 can include a system (not shown) for receiving requests to provision portions of available computing resources. Users of the computing infrastructure 500 may request to provision portions of the computing infrastructure 500 to run their own software applications, store data, or perform some service made available by the infrastructure. Although shown as separate components, in some examples, the computing infrastructure 500 implements the validation system 100, such that requests are processed for validation automatically, prior to being used for provisioning a computing environment.

An IaC configuration file characterizes the nature, quantity, or other features of computing resources of the computing infrastructure 500 requested to be provisioned. For example, an IaC configuration file may specify various components requested to form part of an environment. These components may be physical, e.g., hardware accelerators or physical storage devices, and/or virtual, e.g., virtual machines, nodes, data containers. In some examples, the IaC configuration file specifies changes to an existing environment in the computing infrastructure 500.

The IaC configuration file may further specify characteristics for characterized resources, e.g., a name, software version, quantity of compute, memory, or network bandwidth, locations for the resources, types or versions of hardware or software requested as part of launching the environment, and so on. Different types of IaC configuration files exist, with different syntax rules, formatting requirements, etc. The computing infrastructure 500 can be configured for receiving requests with IaC configuration files of one or more possible types.

User computing device 104 can be a device, such as a personal laptop, desktop computer, mobile device, wearable device, etc. The user computing device 104 may be controlled by one or more users or entities requesting resources at the computing infrastructure 500. In some examples, operations performed by the user computing device 104 are automated, e.g., for generating validation requests, generating validation responses, and sending valid IaC configuration files to the computing infrastructure 500 for provisioning new environments or updating existing environments. The user computing device 104 can be configured with software, e.g., code editors, interpreters, and/or compilers, for generating IaC configuration files.

Prior to providing the IaC configuration file to the computing infrastructure 500, the user computing device 104 can provide an IaC configuration file as part of a validation request 102 to the validation system 100. An IaC configuration file is considered valid when the configuration of an environment provisioned in accordance with the IaC configuration file conforms to requirements set out by one or more policies. The applicable policies depend on, for instance, the organization managing the user computing device 104, the computing infrastructure 500, and/or software or data that may be executed or stored in a provisioned computing environment. A policy can be a set of rules, thresholds, guidelines, etc. The policy may be unstructured, e.g., in natural language, structured, e.g., a set of values and logical statements enforcing compliance of IaC configuration files to meet these values, or a combination of the two.

For example, an IaC configuration file may specify the maximum transmission unit (MTU) representing how large of data packets in bytes a resource in a computing environment may accept if provisioned according to the configuration file. A policy defined by the computing infrastructure 500 may require that the MTU for any resource not exceed 1000 bytes. An IaC configuration file with a resource having an MTU of 1500 would be invalid in view of this example policy for the computing infrastructure 500.

The user computing device 104 may be managed by an organization of one or more users, developers, managers, etc., with its own policies. As another example, a policy defined by an organization associated with the user computing device 104 may require that access privileges for containers in a provisioned environment be handled uniformly, e.g., with the same access privilege across all containers. Uniform handling of containers may be represented by a line in an IaC configuration file, such as the "uniform_container_level_access=true." An IaC configuration file with this variable set to "false" would be invalid in view of the policy for the organization.

The preceding example of enforcing uniform container access privileges is also an example of potential security violations that may arise if an invalid IaC configuration file is provided as part of a provisioning request to the computing infrastructure 500. For example, if uniform access is not enforced, then it becomes possible for a container in a provisioned environment to be accessible in unexpected or unintended ways, for example devices that ordinarily would not be granted access to these containers.

Software applications or other workloads intended to run on a computing environment may be associated with policies specific to those applications, workloads, or types of applications or workloads. For example, certain applications running in an environment may be built with a minimum computing resource requirements and can provide for scaling execution up or down in response to incoming input data. For example, an application may require execution on a pool of resources including at least three nodes or units of computation. An IaC configuration file would be considered invalid for use in provisioning an environment for this example application, if for example the file specified only two nodes in a pool of resources.

The validation request 102 includes a IaC configuration file 102A to be validated, as well as identifiers 102B for identifying the policy from which validation requirements should be used for validating the IaC configuration file. The identifiers 102B can include, for example, identifiers for the user or organization, the infrastructure on which a computing environment corresponding to the IaC configuration is to be deployed, and/or the specific applications to be executed on the deployed computing environment. In some examples, the identifiers are predetermined, for example, based on previous interactions between the user computing device 104 and the validation system 100, or other inputs provided to the validation system 100 prior to receiving the request 102.

Validation engine 108 is configured to process incoming validation requests, and output validation responses 110 through the user interface 106. A validation response 110 includes an indication 110A of whether a received IaC configuration file is valid or invalid. The indication 110A can be in the form of natural language, e.g., "the input IaC configuration is valid," or "the input IaC configuration is invalid."

The validation engine 108 determines the applicable policies based on identifiers in the validation request 102. As described herein, the identifiers are used by the validation engine 108 to query policy document sources 118 corresponding to the identifiers provided in the validation request 102. Policy documents can be stored in policy document repository 120, which can be one or more storage devices implementing a database or other form of data storage. Policy document sources 118 can include websites or databases maintained by organizations, developers or providers of software applications, computing infrastructure providers, or any other source where an IaC validation policy may be available.

The validation system 100 can be configured to retrieve policy documents corresponding to various different organizations, users, computing infrastructures, and specific applications or services. For example, the validation system 100 can receive policy documents through the user interface 106 and store the policy documents in the policy document repository 120. The validation system 100 can receive policy documents from the policy document sources 118, for example by querying or scraping policy documents from websites, online databases, and so on. The validation system 100 can maintain and update the policy document repository 120. The updating can occur periodically, in response to receiving new or updated policy documents, or in response to other input.

If a received IaC configuration file is invalid, the validation response 110 can include an explanation 110B, as well as a suggested fix 120C in the form of additional explanation and/or code snippets modifying the IaC configuration file. Validation responses generated by the system 100 can vary from example-to-example. For instance, an explanation 110B and/or suggested fix 110C may not be provided if the indication 110A is that the IaC configuration file 102A is valid. The system 100 can also be configured to provide more detailed or less detailed responses, for example based on input from the user computing device 104. The validation response 110 can be provided to the user computing device 104 as a combination of unstructured text, e.g., natural language, and structured text, e.g., code snippets with recommended fixes for validating an IaC configuration file.

In the example above of an IaC configuration file specifying a resource with an MTU of 1500 against a policy limit of 1000, the validation response 110 can include the following: "The received IaC configuration file is invalid. {Resource Name} is specified with an MTU of 1500, but MTU limit is 1000." The validation response 110 can also include a reference to the applicable policy, as well as a suggested fix. The suggested fix can be in the form of a code snippet change, written in correct syntax corresponding to the IaC configuration file. As described herein, the validation engine 108 interacts with a language model 112 and an embedding repository 114 of encoded representations of syntactically valid IaC configuration files to reduce or eliminate syntax errors in output suggested fixes.

The validation request 102 may be sent by the user computing device 104 and received by the system 100 through a user interface 106. The validation response 110 may also be provided through to the user interface 106 to the user computing device 104. The user interface 106 can include a chat interface, such as for a chat-bot agent implementing a language model. Requests can be provided through the chat interface, including the IaC configuration file and policy identifiers. Validation responses 110 can be sent back by the system 100 in the form of a continuing chat dialogue with a chat-bot agent. In some examples, the user interface 106 may be a web page, a standalone desktop application, one or more APIs exposing the validation system 100 to the user computing device 104, or any other mechanism for communicating data between devices.

The user computing device 104 can be configured to allow for editing an IaC configuration file, for example manually or automatically in response to the validation response 110. The user computing device 104 may generate an updated IaC configuration file, shown in FIG. 1 as valid IaC configuration file 116. The user computing device 104 can send the valid IaC configuration file 116 as part of a provisioning request to the computing infrastructure 500. Thereafter, the user computing device 104 can send new or update IaC configuration requests to the validation system 100.

The validation system 100 can store policy documents or portions of policy documents as rows of data. Each row can be further annotated with additional information, such as identifiers corresponding to the source of the policy documents, when the policy was last retrieved or updated, or other metadata that can be used for also querying the policy document repository 120. The validation engine 108 is configured to query the policy document repository 120 for policy documents responsive to the identifiers 102B. For example, the repository 120 can include a database management system or other system for receiving queries and determining results from a database responsive to the query. A responsive result may be rows of data with identifiers that match or are within a predetermined similarity threshold to the identifiers 102B. The policy document repository 120 provides policy documents to the validation engine 108.

The validation system 100 can include an embedding repository 114. The embedding repository 114 can store encoded representations of IaC syntax documents related to IaC configuration file syntax. IaC syntax documents can include syntactically correct and syntactically incorrect examples of IaC syntax. IaC syntax documents can be retrieved from IaC syntax document sources 122, which can include templates, code snippets or examples, and so on. An example source can be a manual or documentation published by an author of a type of IaC configuration. The validation system 100 can receive the IaC syntax documents using the same techniques described herein with reference to the policy document sources 118.

Embedding repository 114 can include a management system (not shown) for generating and storing embeddings or other encoded representations of the IaC syntax documents. The embedding repository 114 can implement any manner of encoders for generating encoded representations of text. The embedding repository 114 can further be configured to receive input embeddings and identify stored embeddings within a similarity threshold of the input embeddings. The IaC syntax documents used to populate the embedding repository 114 can also be used as fine-tuning data for fine-tuning the language model 112 to generate more syntactically accurate syntax of different types of IaC configuration files.

The validation engine 108 is configured to send the IaC configuration file 102A to the embedding repository 114 for identifying stored embeddings that are similar to the input embedding. The embedding repository 114 can generate an embedding of the IaC configuration file 102A, using the same encoder used to generate stored embeddings. The similar embeddings represent IaC syntax documents that the model 112 can use as additional input for generating suggested fixes to the potentially invalid IaC configuration file 102A. These IaC syntax documents become a form of additional context, reducing the potential that the language model 112 generates incorrect fixes, at least because model 112 can compare potential output with the IaC syntax documents. As the IaC syntax documents are labeled in the embedding repository 114, suggested fixes that are similar to IaC syntax documents translate to suggested fixes that are less likely to be syntactically incorrect.

In some examples, the validation engine 108 and the embedding repository 114 implements a form of retrieval augmented generation (RAG) for encoding the IaC syntax documents, querying the embedding repository 114, and retrieving IaC syntax documents that are added to the overall prompt to the language model 112.

Figure 2:
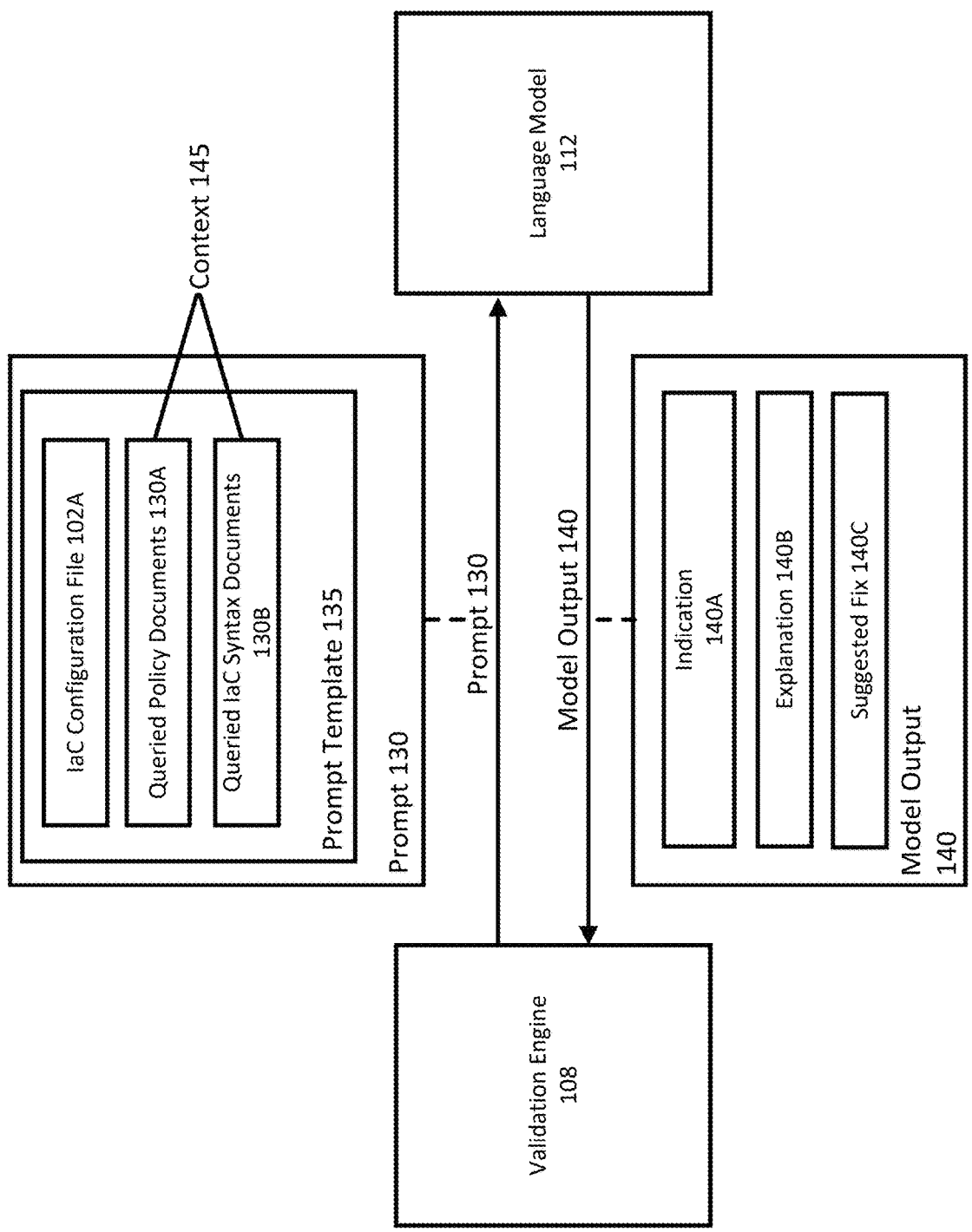
FIG. 2 is a block diagram of an example prompt with context generated by the validation engine and provided to the language model, according to aspects of the disclosure.

FIG. 2 is a block diagram of an example prompt with context generated by the validation engine 108 and provided to the language model 112. Prompt 130 can be formatted according to prompt template 135. The prompt template 135 can structure the various components of the prompt 130 and provide initial instructions to the language model 112 for performing IaC configuration file validation.

The initial instructions can be written in natural language, e.g., "Determine whether the provided IaC configuration file is valid in accordance with the provided policy documents. If the IaC configuration file is invalid, explain why, and provide a suggested fix. The suggested fix should be syntactically correct. The queried IaC syntax documents are provided as examples of syntactically correct code for this type of IaC configuration file." Other instructions are possible with more or less provided information. Additional instructions or instructions modifying the initial instructions may be provided in some examples, for example as part of the validation request 102.

Prompt template 135 can also define a format for queried policy documents 130A and the queried IaC syntax documents 130B. Collectively, the documents 130A, 130B may be referred to as at least partially forming context 145. The validation engine 108 can be configured to format the prompt 130 in accordance with the prompt template 135, prior to providing the prompt 130 to the language model 112.

Model output 140 can include an indication 140A of whether the IaC configuration file 102A is valid, an explanation as to the reason for the indication provided, and a possible suggested fix 140C, for example in the form of a code snippet correcting parts of the IaC configuration file 102A causing the model 112 to determine that it is invalid. The indication 140A, explanation 140B, and suggested fix 140C may be compared with the indication 110A, explanation 110B, and suggested fix 110C of the validation response 110 in FIG. 1. The components of the validation response 110 may be formatted versions of corresponding components of the model output 140. For example, the model output 140 may be in a format not suitable for direct output, and the validation engine 108 can be configured to perform post-processing on the model output 140 before results are provided as a response to the request 102. In some examples, the model output 140 is provided as the validation response 110.

The language model 112 can be any type of machine learning model trained for receiving text prompting the model 112 to determine whether input IaC configuration files are valid and providing explanations and/or suggested fixes when the configuration files are determined to be invalid. Example architectures can be based on neural networks, such as auto-encoders or transformer architectures. The language model 112 may be a large language model 112 pre-trained on a corpus of training data including text. Other example architectures can include generative models, such as language models, foundation models, and/or graphical models. One or more model architectures can be generated that can output results associated with IaC configuration file validation.

The language model 112 allows for IaC configuration validation over a variety of different policy documents, with varying levels of specificity and applicability to different IaC configuration files the validation system 100 may receive. The natural language input and output format enables expressive responses to guide a user to understanding reasons for why an IaC configuration may or may not be valid. By adding additional context 145 in the form of additional documents to the prompt 130, the validation system balances leveraging the expression utility of the language model against the heightened sensitivity and consequence of incorrect responses. Because invalid IaC configurations can lead to latent security vulnerabilities, which may go undetected for an extended period of time, the validation system 100 provides the additional context 145 to focus the model output to the correct policy documents, as well as to ensure that code suggestions provided are syntactically correct.

Instead of hard-coding scanner logic that is specific to particular policies and IaC configuration types, the validation system 100 separates the knowledge from the processing, e.g., by providing routinely updated repositories that can be updated and accessed independently of changing any model logic or parameter values in the language model 112.

Figure 5:
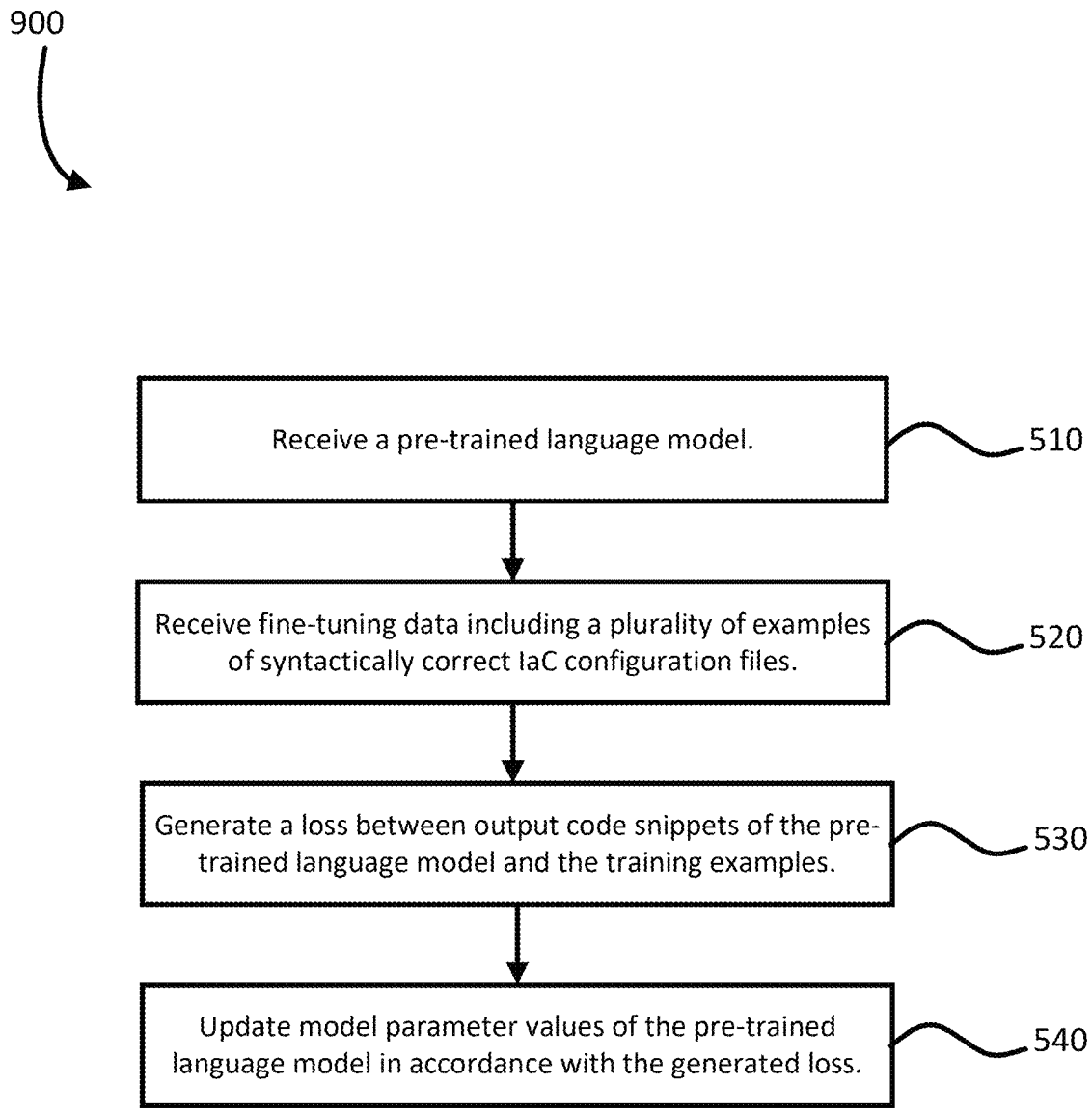
FIG. 5 depicts a flow diagram of an example process for fine-tuning a language model trained for IaC configuration file validation, according to aspects of the disclosure.

A pre-trained language model 112 can be further fine-tuned, for example as described herein with reference to FIG. 5, to reduce inaccuracies and hallucinations in the form of syntactically incorrect IaC configuration suggested fixes. Fine-tuning on IaC syntax also allows the model 112 to handle validation requests for different types of IaC configuration files, e.g., written according to different syntaxes or formats. The language model 112 does not require fine-tuning or training on specific examples of policy documents. Not requiring training on specific policy examples allows for a variety of different language models to be used as part of the validation system 100. Policies may be highly-specific and subject to change, making generating training data difficult and inefficient. IaC syntax, on the other hand, is generally static to the type of IaC configuration files, with changes occurring more slowly gradually as a syntax is updated or new features are represented in the syntax.

Figure 3:
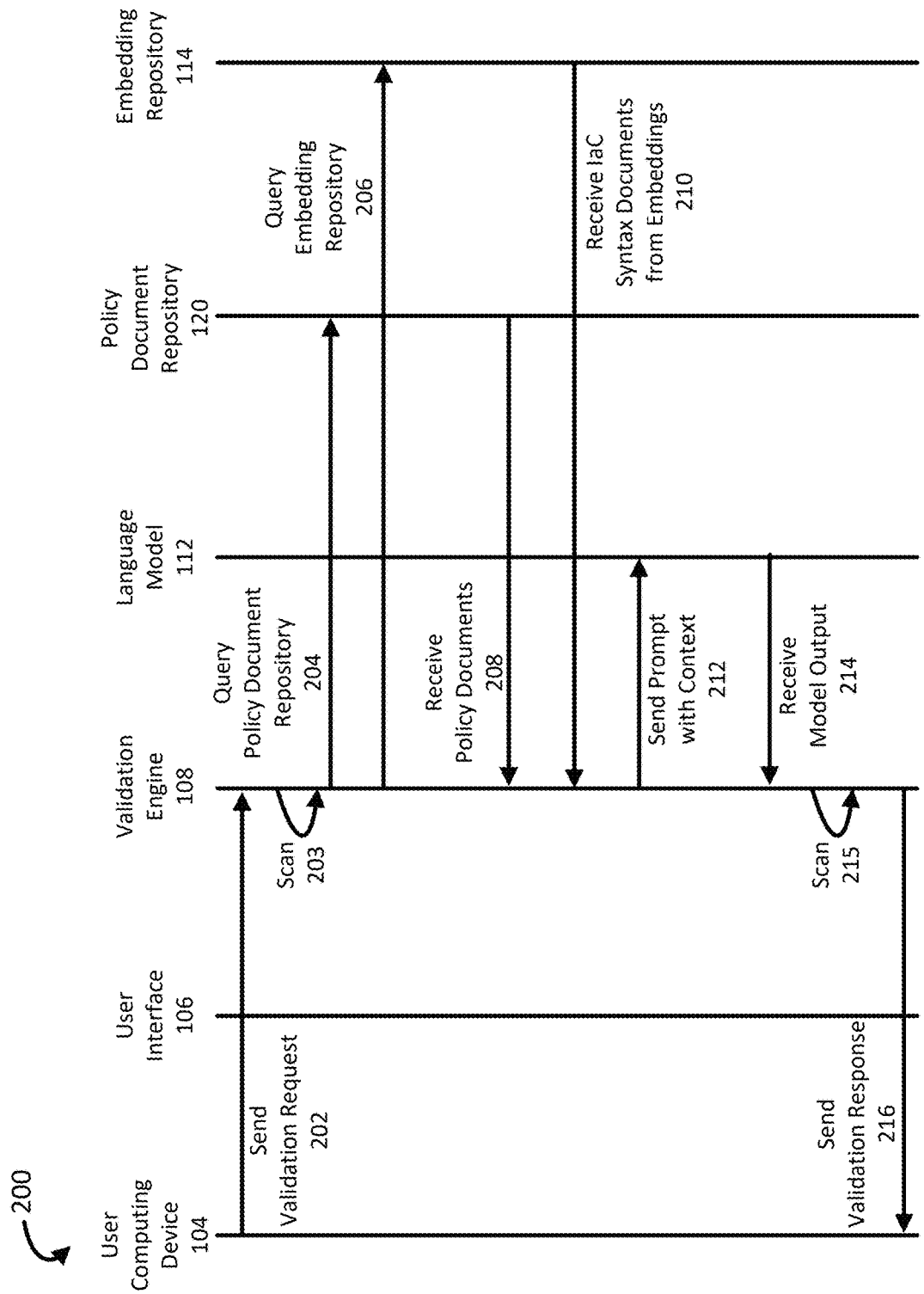
FIG. 3 is a swim lane diagram depicting the example processing of a validation request by the validation system to generate a validation response, according to aspects of the disclosure.

FIG. 3 is a swim lane diagram 200 depicting the example processing of a validation request 102 by the validation system 100 to generate a validation response 110, according to aspects of the disclosure. As shown by arrow 202, user computing device 104 sends validation request 102 to the validation engine 108.

As shown by arrow 203, the validation engine 108 scans IaC configuration file 102A in the request 102 for malicious or malformed code. Malicious or malformed code can include code, which, when executed, causes damage to the underlying system executing the code, leaks, changes, or deletes data, and/or causes the operation of the underlying system to worsen or stop altogether. IaC configuration files may be scanned by the validation system 100 to avoid malicious code or content from being processed by the machine learning model. Pre-scanning the IaC configuration files can reduce the exposure of the language model 112 to malicious code, which in turn reduces the chance the model 112 reproduces the malicious code, for example as a suggested fix.

The validation engine 108 can be configured according to any techniques for scanning source code for malicious or malformed code. These techniques can include AI models trained to detect anomalous code, scanning tools configured to check for specific instances of malformed or malicious code snippets, executing the code in a sandbox or isolated environment and observing its output, or a combination of the preceding. In some examples, scanning may not be performed, for example because the source of the IaC configuration file is predetermined to be a trusted source.

As shown by arrow 204, the validation engine 108 queries the policy document repository 120 using identifiers 102B from the validation request 102. The validation engine 108 can also query the embedding repository 114, as shown by arrow 206. The query embedding repository 114 can encode the IaC configuration file 102A according to the same embedding or other type of encoded representation as the embeddings in the repository 114.

As shown by arrow 208, the validation engine receives policy documents responsive to the identifiers 102B. The validation engine 108 can add the received policy documents to the prompt 130 for sending to the language model 112.

As shown by arrow 210, the validation engine 108 receives IaC syntax documents from embeddings responsive to the query to the embedding repository 114. Responsive embeddings are embeddings that match or are similar to the embedded version of the IaC configuration document 102 within a predetermined similarity threshold. The embedding repository 114 can be configured to decode the responsive embeddings to their original IaC syntax documents, for providing to the validation engine 108. The validation engine 108 can add the IaC syntax documents to the prompt 130.

As shown by arrow 212, the validation engine 108 generates and sends the prompt 130 with context 145 to the language model 112. As described herein, the model 112 is trained and fine-tuned to generate model output as indications of whether an input IaC configuration file is valid, along with an explanation of the model indication and a suggested fix for editing the IaC configuration file 102.

As shown by arrow 214, the validation engine 108 receives the model output from the language model 112. For example, model output can be model output 140 as shown and described with reference to FIG. 2, with indication 140A, explanation 140B, and suggested fix 140C.

In some examples and as shown by arrow 215, output by the machine learning model can also be scanned by the validation engine 108 to prevent inadvertent malicious content from being disseminated. Scanning in this context can refer to evaluating code or content under a predetermined set of rules, to check for the presence or absence of certain strings or patterns of strings of text.

The validation engine 108 sends a validation response to the user computing device 104, using the model output. The validation engine 108 may send the model output directly after scanning for malicious or malformed code, post-process or format the model output, or a combination of the preceding. As shown by block 216, the validation engine sends a validation response, e.g., validation response 110, to the user computing device 104.

Example Methods

Figure 4:
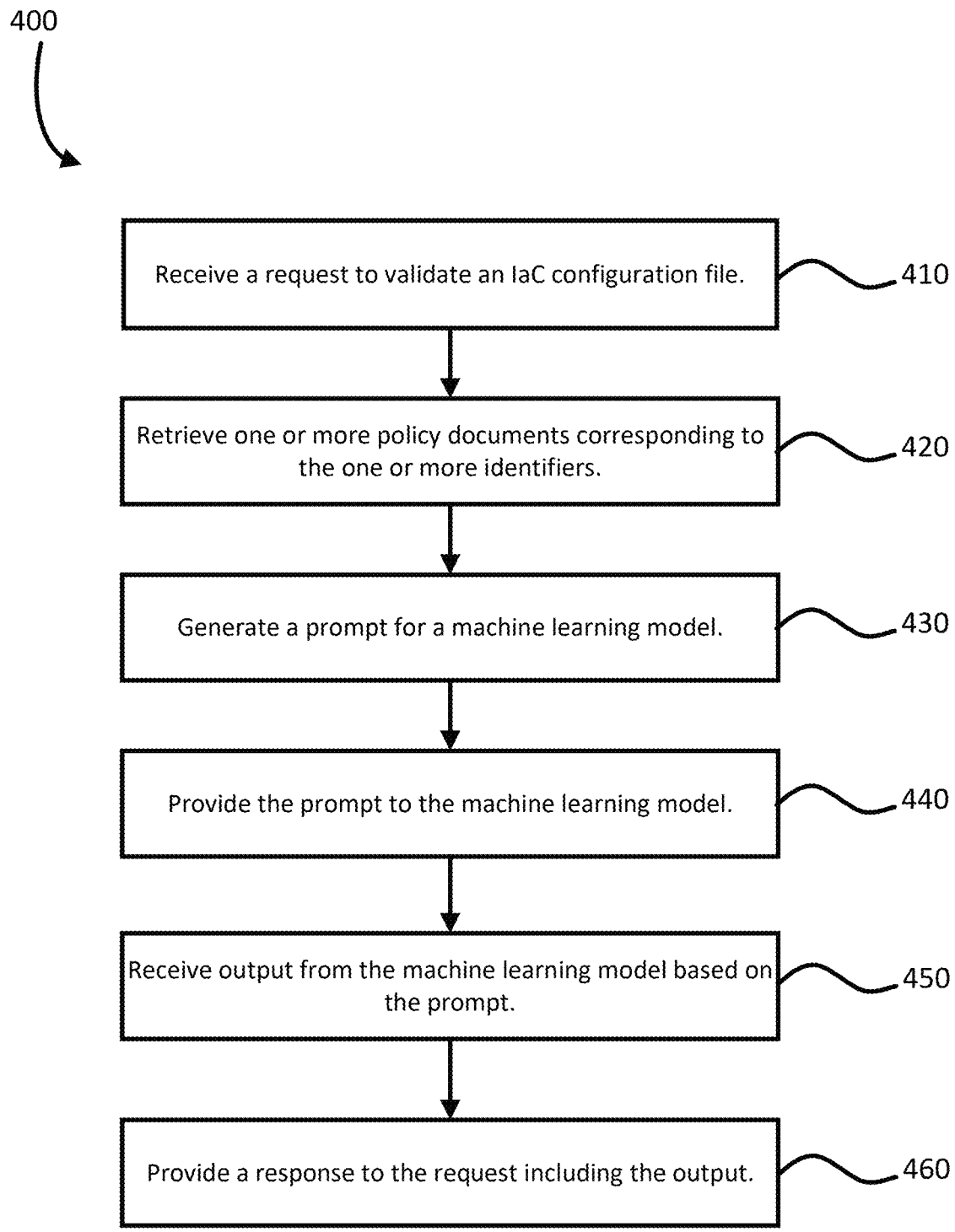
FIG. 4 depicts a flow diagram of an example process for IaC configuration file validation, according to aspects of the disclosure.

FIG. 4 depicts a flow diagram of an example process 400 for IaC configuration file validation, according to aspects of the disclosure. The example process can be performed on a system of one or more processors in one or more locations, such as the validation system 100 of FIG. 1. The operations of the example processes described herein, including the process 400 and the process 900, do not have to be performed in the precise order described below. Rather, various operations can be handled in a different order or simultaneously, and operations may be added or omitted.

The system receives a request to validate an IaC configuration file, according to block 410. The request can include the IaC configuration file and one or more identifiers. For example, the request can be formatted like the validation request 102 with the IaC configuration file 102A and the identifiers 102B as shown and described with reference to FIGS. 1 and 2.

The system retrieves one or more policy documents corresponding to the one or more identifiers, according to block 420. The one or more identifiers can identify one or more of a computing infrastructure, a user or organization corresponding to the request, or an application to be deployed on a computing environment configured in accordance with the IaC configuration file.

For example, the system can implement a validation engine configured to query a policy document repository with policy documents annotated with identifiers and other metadata that may be compared with the one or more identifiers. The policy documents can include natural language, structured code, or both natural language and structured code.

The system is configured to generate the repository of policy documents, for example as described herein with reference to FIG. 1 and the policy document repository 120. Policy documents in the repository can be labeled or include metadata corresponding to one or more of: a policy author, an entity corresponding to the policy document, an asset, e.g., data or a software application, corresponding to the policy documents, one or more policy conditions or requirements specified in the policy, and/or suggested fixes for violations of the one or more policy conditions.

The system generates a prompt for a machine learning model, according to block 430. For example, and as described herein with reference to FIG. 2, the prompt can include initial instructions, an IaC configuration file, queried policy documents, and queried IaC syntax documents.

Generating the prompt can include retrieving IaC syntax documents from an embedding repository, such as the embedding repository 114. The system can generate an encoded representation, e.g., an embedding, of the IaC configuration file. The system can query, using the encoded representation of the request, an embedding repository including encoded representations, e.g., embeddings, of examples of syntactically correct IaC configuration files. As described herein with reference to FIG. 5, the syntactically correct IaC configuration file can be used as fine-tuning data for fine-tuning the language model. IaC configuration files can be retrieved from various available sources, e.g., IaC syntax document sources 122 of FIG. 1. The system can retrieve the one or more encoded representations of syntactically correct IaC configuration files within a predetermined threshold of similarity to the encoded representation of the IaC configuration file. Retrieved configuration files can be added to the prompt and provided to the machine learning model.

The system provides the prompt to the machine learning model, according to block 440 and receives output from the machine learning model based on the prompt, according to block 450. The received output can include an indication of whether the IaC configuration file is valid based on the provided policy documents. The received output can also include a natural language explanation of why or how the model determined that the IaC configuration file was valid or invalid. If the IaC configuration is deemed invalid, the model output can include a code snippet to suggest a fix to the IaC configuration file. The additional context provided by the queried syntax documents reduces the chance that the model 112 hallucinates a suggested fix that is not syntactically correct.

The system provides a response to the request including the output, according to block 460. The response may be the model output, or a post-processed and/or formatted version of the model output, provided to a user computing device in response to the request and through a user interface.

FIG. 5 depicts a flow diagram of an example process 900 for fine-tuning a language model trained for IaC configuration file validation, according to aspects of the disclosure. For example, a model training engine, such as model training engine 635 described herein with reference to FIG. 6, can be configured to perform the process 900. The model training engine may be part of a validation system, such as the validation system 100, a computing infrastructure, such as the computing infrastructure 500, and/or as part of a device in a location separate from the devices implementing the system 100 or infrastructure 500.

The model training engine receives a pre-trained language model, according to block 510. For example, the language model can be a large language model. The model can be pre-trained on a corpus of training data that includes text to predict text given an input prompt.

The model training engine receives fine-tuning data including a plurality of examples of syntactically correct IaC configuration files, according to block 520. For example, the IaC configuration files can be obtained by a validation system from IaC syntax document sources 122 as shown and described with reference to FIG. 1. The fine-tuning data can also include examples of labeled syntactically incorrect IaC configuration files.

The model training engine can remove or modify different parts of the syntactically correct IaC configuration files to generate inputs of syntactically incorrect IaC configuration files. The model training engine can provide the syntactically incorrect IaC configuration files to the model with a prompt instructing the model to correct the syntax. The output code snippet can be a model prediction of how the syntax of the syntactically incorrect IaC configuration would be fixed.

The model training engine generates a loss between output code snippets of the pre-trained language model and the training examples, according to block 530. The loss function used to compute the loss can be, for example, a negative cosine similarity between embeddings of the training examples and embeddings of the output code snippets, to fine-tune the model towards generating code snippets with higher measures similarities to the training examples.

The model training engine updates model parameter values of the pre-trained language model in accordance with the generated loss, according to block 540. For example, the model training engine can update model parameter values of the pre-trained language model using backpropagation with gradient descent. The model training engine can perform multiple iterations of the operations of blocks 520, 530, and 540, until meeting one or more stopping criteria, such as a number of iterations for training, a maximum period of time, the losses converging to within a threshold range, or when a minimum accuracy threshold is met.

Example Computing Environments and Infrastructures

Figure 6:
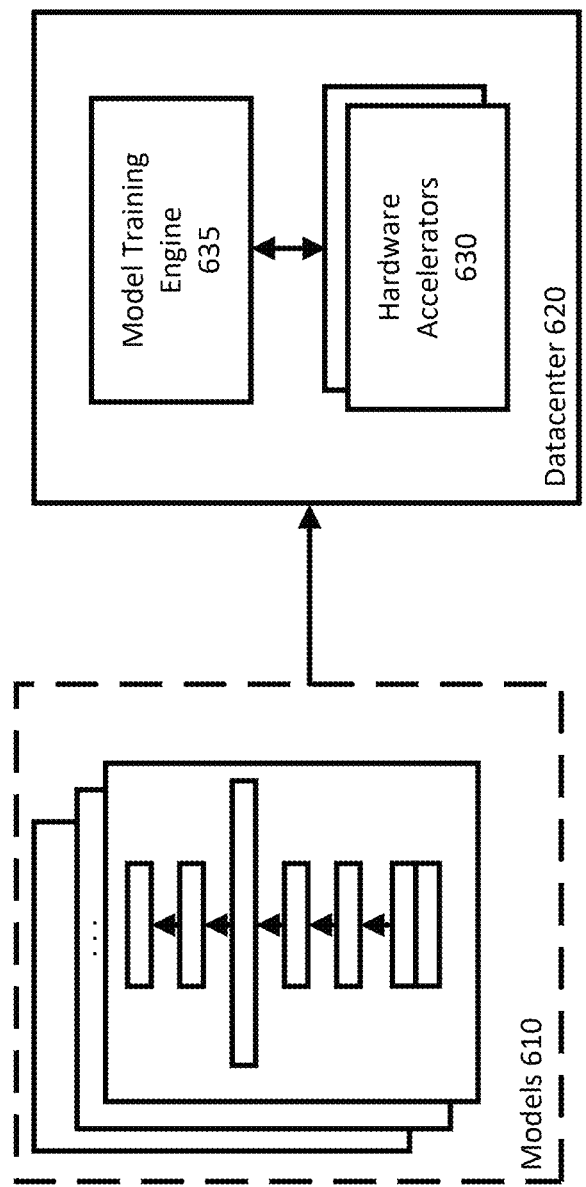
FIG. 6 depicts a block diagram of an example computing environment, according to aspects of the disclosure.

FIG. 6 is a block diagram illustrating one or more models 610, such as for deployment in a datacenter 620 housing one or more hardware accelerators 630 on which the deployed models will execute for IaC configuration validation. The hardware accelerators 630 can be any type of processor, such as a central processing unit (CPU), graphics processing unit (GPU), field-programmable gate array (FPGA), or an application-specific integrated circuit (ASIC), such as a tensor processing unit (TPU).

An architecture of a model can refer to characteristics defining the model, such as characteristics of layers for the model, how the layers process input, or how the layers interact with one another. For example, the model can be a convolutional neural network that includes a convolution layer that receives input data, followed by a pooling layer, followed by a fully connected layer that generates a result. The architecture of the model can also define types of operations performed within each layer. For example, the architecture of a convolutional neural network may define that rectified linear unit (ReLU) activation functions are used in the fully connected layer of the network. Other example architectures can include generative models, such as language models, foundation models, and/or graphical models. One or more model architectures can be generated that can output results associated with IaC configuration file validation.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, a supervised learning technique can be applied to calculate an error between outputs, with a ground-truth label of a training example processed by the model.

Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

Datacenter 620 can also house devices for training or fine-tuning machine learning models, implementing model training engine 635. Model training engine 635 is configured for training or fine-tuning machine learning models consistent with aspects of the disclosure and can optionally apply any type of optimization technique, e.g., regularization, drop-out, Adam optimizer, etc., for processing training data more efficiently and/or more accurately.

Figure 7:
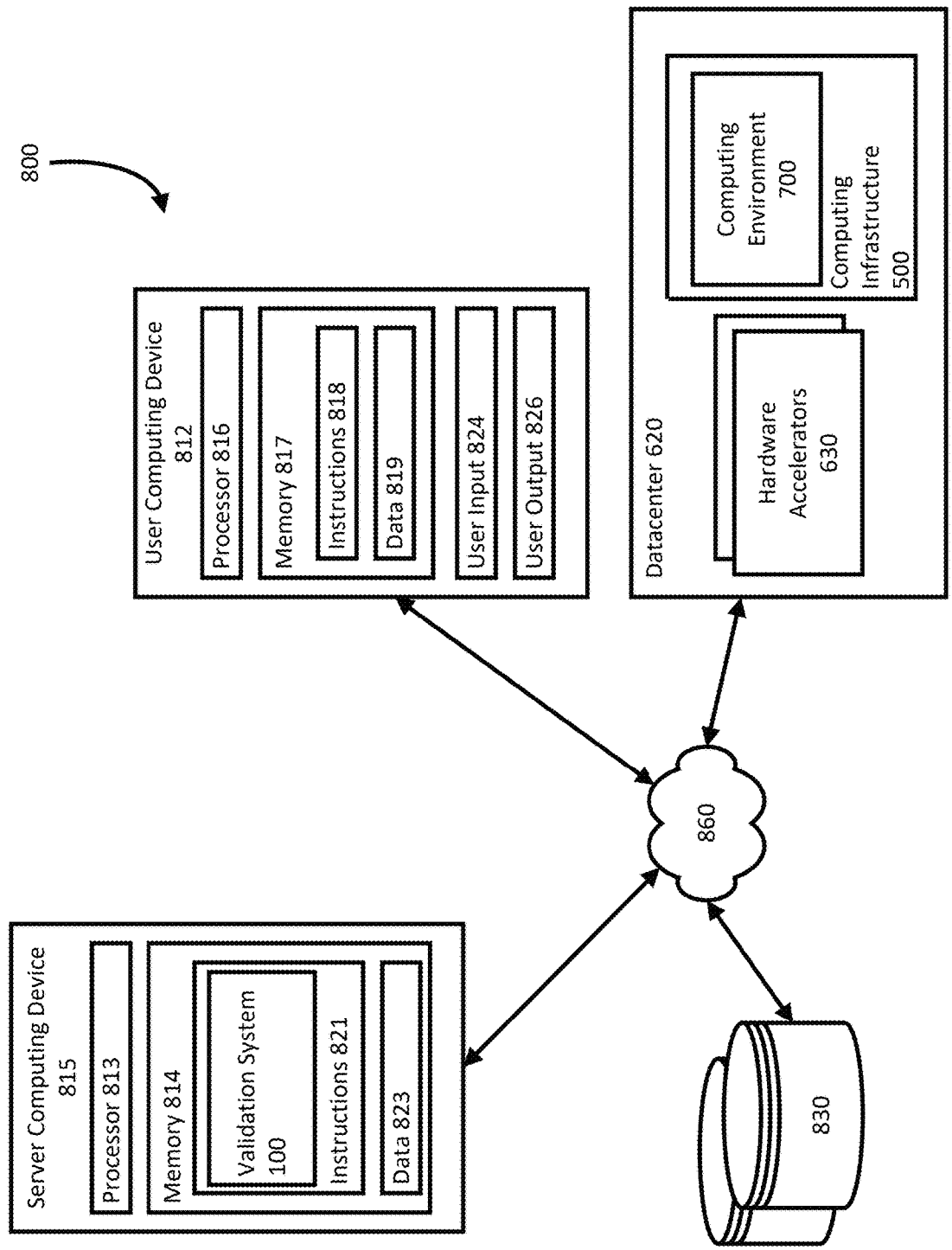
FIG. 7 is a block diagram of an example computing environment for implementing the validation system, according to aspects of the disclosure.

FIG. 7 is a block diagram of an example computing environment 800 for implementing the validation system 100. The system 100 can be implemented on one or more devices having one or more processors in one or more locations, such as in server computing device 815. User computing device 812 and the server computing device 815 can be communicatively coupled to one or more storage devices 830 over a network 860. The storage device(s) 830 can be a combination of volatile and non-volatile memory and can be at the same or different physical locations than the computing devices 812, 815. For example, the storage device(s) 830 can include any type of non-transitory computer readable medium capable of storing information, such as a hard-drive, solid state drive, tape drive, optical storage, memory card, ROM, RAM, DVD, CD-ROM, write-capable, and read-only memories.

Aspects of the disclosure can be implemented in a computing system that includes a back-end component, e.g., as a data server, a middleware component, e.g., an application server, or a front-end component, e.g., user computing device 812 having a user interface, a web browser, or an app, or any combination thereof. The components of the system can be interconnected by any form or medium of digital data communication, such as a communication network. Examples of communication networks include a local area network (LAN) and a wide area network (WAN), e.g., the Internet. The datacenter 620 can also be in communication with the user computing device 812 and the server computing device 815.

The network 860 can connect network nodes, such as server computing 815, user computing device 812, and devices in datacenter 620 can participate in the network 860 as data sources, data destinations or data sinks, and/or intermediary nodes such as switches, routers, and/or gateways propagating data from sources towards destinations through the network 860. The network 860 includes links to various other participating network nodes. Example networks may have fewer or more nodes or components, consistent with aspects of the disclosure.

The network 860 can facilitate interactions between participant devices. Example networks include the Internet, a local network, a network fabric, or any other local area or wide area network. The network 860 can be composed of multiple connected sub-networks or autonomous networks. Any type and/or form of data network and/or communication network can be used for the network 860. The network can be public, private, or a combination of public and private. In general, the network 860 can be used to convey information between computing devices, such as between the server computing device 815, the datacenter 620, and the user computing device 812.

The computing system can include clients, e.g., user computing device 812 and servers, e.g., server computing device 815. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

The server computing device 815 can include one or more processors 813 and memory 814. The memory 814 can store information accessible by the processor(s) 813, including instructions 821 that can be executed by the processor(s) 813. The memory 814 can also include data 823 that can be retrieved, manipulated, or stored by the processor(s) 813. The memory 814 can be a type of non-transitory computer readable medium capable of storing information accessible by the processor(s) 813, such as volatile and non-volatile memory. The processor(s) 813 can include one or more central processing units (CPUs), graphic processing units (GPUs), field-programmable gate arrays (FPGAs), and/or application-specific integrated circuits (ASICs), such as tensor processing units (TPUs).

Virtual machines 310 are examples of computing resources that may be provisioned as part of a computing environment, in accordance with an IaC configuration file. Other types of resources include data containers, compute nodes, storage devices, bare-metal hardware, and/or other types of virtualized or physical resources collectively forming part of the computing infrastructure 500.

The instructions 821 can include one or more instructions that when executed by the processor(s) 813, causes the one or more processors to perform actions defined by the instructions. The instructions 821 can be stored in object code format for direct processing by the processor(s) 813, or in other formats including interpretable scripts or collections of independent source code modules that are interpreted on demand or compiled in advance. The instructions 821 can include instructions for implementing the system 100 consistent with aspects of this disclosure. The system 100 can be executed using the processor(s) 813, and/or using other processors remotely located from the server computing device 815.

The data 823 can be retrieved, stored, or modified by the processor(s) 813 in accordance with the instructions 821. The data 823 can be stored in computer registers, in a relational or non-relational database as a table having a plurality of different fields and records, or as JSON, YAML, proto, or XML documents. The data 823 can also be formatted in a computer-readable format such as, but not limited to, binary values, ASCII, or Unicode. Moreover, the data 823 can include information sufficient to identify relevant information, such as numbers, descriptive text, proprietary codes, pointers, references to data stored in other memories, including other network locations, or information that is used by a function to calculate relevant data.

The user computing device 812 can also be configured similar to the server computing device 815, with one or more processors 816, memory 817, instructions 818, and data 819. For example, the user computing device 812 can be a mobile device, a laptop, a desktop computer, a game console, etc. The user computing device 812 can also include a user output 826, and a user input 824. The user input 824 can include any appropriate mechanism or technique for receiving input from a user, including acoustic input; visual input; tactile input, including touch motion or gestures, or kinetic motion or gestures or orientation motion or gestures; auditory input, speech input, etc., Example devices for user input 824 can include a keyboard, mouse or other point device, mechanical actuators, soft actuators, touchscreens, microphones, and sensors.

The server computing device 815 can be configured to transmit data to the user computing device 812, and the user computing device 812 can be configured to display at least a portion of the received data on a display implemented as part of the user output 826. The user output 826 can also be used for displaying an interface between the user computing device 812 and the server computing device 815. The user output 826 can alternatively or additionally include one or more speakers, transducers or other audio outputs, a haptic interface or other tactile feedback that provides non-visual and non-audible information to the platform user of the user computing device 812.

Although FIG. 7 illustrates the processors 813, 816 and the memories 814, 817 as being within the computing devices 815, 812, components described in this specification, including the processors 813, 816 and the memories 814, 817 can include multiple processors and memories that can operate in different physical locations and not within the same computing device. For example, some of the instructions 821, 818 and the data 823, 819 can be stored on a removable SD card and others within a read-only computer chip. Some or all of the instructions and data can be stored in a location physically remote from, yet still accessible by, the processors 813, 816. Similarly, the processors 813, 816 can include a collection of processors that can perform concurrent and/or sequential operation. The computing devices 815, 812 can each include one or more internal clocks providing timing information, which can be used for time measurement for operations and programs run by the computing devices 815, 812.

The server computing device 815 can be configured to receive requests to process data from the user computing device 812. For example, the environment 800 can be part of a computing platform configured to provide a variety of services to users, through various user interfaces and/or APIs exposing the platform services. One or more services can be a machine learning framework or a set of tools for training or executing generative models or other machine learning models according to a specified task and training data.

The devices 812, 815 can be capable of direct and indirect communication over the network 860. The devices 815, 812 can set up listening sockets that may accept an initiating connection for sending and receiving information. The network 860 itself can include various configurations and protocols including the Internet, World Wide Web, intranets, virtual private networks, wide area networks, local networks, and private networks using communication protocols proprietary to one or more companies. The network 860 can support a variety of short- and long-range connections. The short- and long-range connections may be made over different bandwidths, such as 2.402 GHz to 2.480 GHz (commonly associated with the Bluetooth® standard), 2.4 GHz and 5 GHZ (commonly associated with the Wi-Fi® communication protocol); or with a variety of communication standards, such as the LTE® standard for wireless broadband communication. The network 860, in addition or alternatively, can also support wired connections between the devices 812, 815, including over various types of Ethernet connection.

Virtual machines 310 are examples of computing resources that may be provisioned as part of a computing environment, in accordance with an IaC configuration file. Other types of resources include data containers, compute nodes, storage devices, bare-metal hardware, and/or other types of virtualized or physical resources collectively forming part of the computing infrastructure 500.

Although a single server computing device 815, user computing device 812, and datacenter 620 are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Implementations of the present technology can each include, but are not limited to, the following. The features may be alone or in combination with one or more other features described herein. In some examples, the following features are included in combination:

(1) A method for Infrastructure-as-Code (IaC) configuration file validation, including: receiving, by one or more processors, a request to validate an IaC configuration file, the request including the IaC configuration file and one or more identifiers; retrieving, by the one or more processors, one or more policy documents corresponding to the one or more identifiers; generating, by the one or more processors, a prompt for a machine learning model, the prompt including the IaC configuration file and the one or more policy documents; providing, by the one or more processors, the prompt to the machine learning model; receiving, by the one or more processors, output from the machine learning model based on the prompt, the output including an indication as to whether the IaC configuration file is valid based on the one or more policy documents; and providing, by the one or more processors, a response to the request including the output.

(2) The method of (1), wherein the one or more identifiers identify one or more of a computing infrastructure, a user corresponding to the request, or an application to be deployed on a computing environment configured in accordance with the IaC configuration file.

(3) The method of (2), wherein the one or more policy documents include natural language, structured code, or both natural language and structured code.

(4) The method of any one of (1) through (3), further including fine-tuning the machine learning model, including: receiving, by the one or more processors, a pre-trained language model; and performing, by the one or more processors, one or more fine-tuning iterations of: receiving fine-tuning data including a plurality of training examples of syntactically correct IaC configuration files, generating a loss between output code snippets of the pre-trained language model and the training examples of syntactically correct IaC configuration files, and updating one or more model parameter values of the pre-trained language model in accordance with the generated loss.

(5) The method of (4), wherein generating the prompt includes: generating, by the one or more processors, an encoded representation of the IaC configuration file; querying, by the one or more processors and using the encoded representation of the request, an embedding repository including encoded representations of examples of syntactically correct IaC configuration files; retrieving, by the one or more processors, one or more encoded representations of syntactically correct IaC configuration files within a predetermined threshold of similarity to the encoded representation of the IaC configuration file; and adding to the prompt, by the one or more processors, the syntactically correct IaC configuration files.

(6) The method of (5), further including generating, by the one or more processors, the embedding repository, wherein the embedding repository includes encoded representations of the plurality of training examples of syntactically correct IaC configuration files in the fine-tuning data.

(7) The method of any one of (4) through (6), further including: generating, by the one or more processors, a repository of policy documents, wherein a policy document in the repository includes a label corresponding to one or more of: a policy author, an entity corresponding to the policy document, an asset corresponding to the policy documents one or more policy conditions, or suggested fixes for violations of one or more policy conditions.

(8) A system including one or more processors and memory, the system configured to perform, by the one or more processors, operations of the method of any one of (1) through (7).

(9) One or more computer-readable storage media storing instructions that are operable, when executed by one or more processors, to cause the one or more processors to perform operations as in any one of (1) through (7).

(10) The one or more computer-readable storage media of (9), wherein the one or more computer-readable storage media are non-transitory.

A computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus. A computer program may, but need not, correspond to a file in a file system. A computer program can be stored in a portion of a file that holds other programs or data, e.g., one or more scripts, in a single file, or in multiple coordinated files, e.g., files that store one or more engines, modules, sub-programs, or portions of code.

The term "configured" is used herein in connection with systems and computer program components. For a system of one or more computers to be configured to perform particular operations or actions means that the system has installed software, firmware, hardware, or a combination thereof that cause the system to perform the operations or actions. For one or more computer programs to be configured to perform operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC), such as a Tensor Processing Unit (TPU). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as static or dynamic computational graph frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" can refer to a software-based system, subsystem, or process that is programmed to perform one or more specific functions. The engine can be implemented as one or more software modules or components or can be installed on one or more computers in one or more locations. A particular engine can have one or more processors or computing devices dedicated thereto, or multiple engines can be installed and running on the same processor or computing device. In some examples, an engine can be implemented as a specially configured circuit, while in other examples, an engine can be implemented in a combination of software and hardware.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers. While operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all examples, and it should be understood that the described program components and systems can be integrated together in one or more software or hardware-based devices or computer-readable media.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, desktop computer, a personal digital assistant (PDA), a mobile audio or video player, a game console, a tablet, a virtual-reality (VR) or augmented-reality (AR) device, a Global Positioning System (GPS), or a portable storage device, e.g., a universal serial bus (USB) flash drive, as examples. Examples of the computer or special purpose logic circuitry can include the user computing device 812, the server computing device 815, or the hardware accelerators 630.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method for Infrastructure-as-Code (IaC) configuration file validation, comprising:
   receiving, by one or more processors, a request to validate an IaC configuration file, the request comprising the IaC configuration file and one or more identifiers;
   retrieving, by the one or more processors, one or more policy documents corresponding to the one or more identifiers;
   generating, by the one or more processors, a prompt for a machine learning model, the prompt comprising the IaC configuration file and the one or more policy documents;
   providing, by the one or more processors, the prompt to the machine learning model;
   receiving, by the one or more processors, output from the machine learning model based on the prompt, the output comprising an indication as to whether the IaC configuration file is valid based on the one or more policy documents;
   receiving, by the one or more processors, a pre-trained language model; and
   performing, by the one or more processors, one or more fine-tuning iterations of:
      receiving fine-tuning data comprising a plurality of training examples of syntactically correct IaC configuration files,
      generating a loss between output code snippets of the pre-trained language model and the training examples of syntactically correct IaC configuration files, and
      updating one or more model parameter values of the pre-trained language model in accordance with the generated loss; and
   providing, by the one or more processors, a response to the request comprising the output.

2. The method of claim 1, wherein the one or more identifiers identify one or more of a computing infrastructure, a user corresponding to the request, or an application to be deployed on a computing environment configured in accordance with the IaC configuration file.

3. The method of claim 2, wherein the one or more policy documents comprise natural language, structured code, or both natural language and structured code.

4. The method of claim 1, wherein generating the prompt comprises:
   generating, by the one or more processors, an encoded representation of the IaC configuration file;
   querying, by the one or more processors and using the encoded representation of the request, an embedding repository comprising encoded representations of examples of syntactically correct IaC configuration files;
   retrieving, by the one or more processors, one or more encoded representations of syntactically correct IaC configuration files within a predetermined threshold of similarity to the encoded representation of the IaC configuration file; and
   adding to the prompt, by the one or more processors, the syntactically correct IaC configuration files.

5. The method of claim 4, further comprising generating, by the one or more processors, the embedding repository, wherein the embedding repository comprises encoded representations of the plurality of training examples of syntactically correct IaC configuration files in the fine-tuning data.

6. The method of claim 1, further comprising:
   generating, by the one or more processors, a repository of policy documents, wherein a policy document in the repository comprises a label corresponding to one or more of:
      a policy author,
      an entity corresponding to the policy document,
      an asset corresponding to the policy documents
      one or more policy conditions, or
      suggested fixes for violations of one or more policy conditions.

7. A system, comprising:
   one or more processors configured to:
      receive a request to validate an IaC configuration file, the request comprising the IaC configuration file and one or more identifiers;
      retrieve one or more policy documents corresponding to the one or more identifiers;
      generate a prompt for a machine learning model, the prompt comprising the IaC configuration file and the one or more policy documents;
      provide the prompt to the machine learning model;
      receive a pre-trained language model;
      perform one or more fine-tuning iterations of:
         receiving fine-tuning data comprising a plurality of training examples of syntactically correct IaC configuration files,
         generating a loss between output code snippets of the pre-trained language model and the training examples of syntactically correct IaC configuration files, and
         updating one or more model parameter values of the pre-trained language model in accordance with the generated loss;
      receive output from the machine learning model based on the prompt, the output comprising an indication as to whether the IaC configuration file is valid based on the one or more policy documents; and provide a response to the request comprising the output.

8. The system of claim 7, wherein the one or more identifiers identify one or more of a computing infrastructure, a user corresponding to the request, or an application to be deployed on a computing environment configured in accordance with the IaC configuration file.

9. The system of claim 8, wherein the one or more policy documents comprise natural language, structured code, or both natural language and structured code.

10. The system of claim 7, wherein in generating the prompt, the one or more processors are configured to:
generate an encoded representation of the IaC configuration file;
query, using the encoded representation of the request, an embedding repository comprising encoded representations of examples of syntactically correct IaC configuration files;
retrieve one or more encoded representations of syntactically correct IaC configuration files within a predetermined threshold of similarity to the encoded representation of the IaC configuration file; and
add, to the prompt, the syntactically correct IaC configuration files.

11. The system of claim 10, wherein the one or more processors are further configured to generate the embedding repository, wherein the embedding repository comprises encoded representations of the plurality of training examples of syntactically correct IaC configuration files in the fine-tuning data.

12. The system of claim 7, wherein the one or more processors are further configured to:
generate a repository of policy documents, wherein a policy document in the repository comprises a label corresponding to one or more of:
a policy author,
an entity corresponding to the policy document,
an asset corresponding to the policy documents
one or more policy conditions, or
suggested fixes for violations of one or more policy conditions.

13. One or more non-transitory computer-readable storage media storing instructions that are operable, when executed by one or more processors, to cause the one or more processors to perform operations comprising:
receiving a request to validate an IaC configuration file, the request comprising the IaC configuration file and one or more identifiers;
retrieving one or more policy documents corresponding to the one or more identifiers;
generating a prompt for a machine learning model, the prompt comprising the IaC configuration file and the one or more policy documents;
providing the prompt to the machine learning model;
receiving a pre-trained language model; and
performing one or more fine-tuning iterations of:
receiving fine-tuning data comprising a plurality of training examples of syntactically correct IaC configuration files,
generating a loss between output code snippets of the pre-trained language model and the training examples of syntactically correct IaC configuration files, and
updating one or more model parameter values of the pre-trained language model in accordance with the generated loss;
receiving output from the machine learning model based on the prompt, the output comprising an indication as to whether the IaC configuration file is valid based on the one or more policy documents; and
providing a response to the request comprising the output.

14. The one or more non-transitory computer-readable storage media of claim 13, wherein the one or more identifiers identify one or more of a computing infrastructure, a user corresponding to the request, or an application to be deployed on a computing environment configured in accordance with the IaC configuration file.

15. The one or more non-transitory computer-readable storage media of claim 14, wherein the one or more policy documents comprise natural language, structured code, or both natural language and structured code.

16. The one or more non-transitory computer-readable storage media of claim 13, wherein generating the prompt comprises:
generating an encoded representation of the IaC configuration file;
querying, using the encoded representation of the request, an embedding repository comprising encoded representations of examples of syntactically correct IaC configuration files;
retrieving one or more encoded representations of syntactically correct IaC configuration files within a predetermined threshold of similarity to the encoded representation of the IaC configuration file; and
adding to the prompt the syntactically correct IaC configuration files.

17. The one or more non-transitory computer-readable storage media of claim 16, wherein the operations further comprise generating the embedding repository, wherein the embedding repository comprises encoded representations of the plurality of training examples of syntactically correct IaC configuration files in the fine-tuning data.

* * * * *